United States Patent [19]
Griffith

[11] 3,884,768
[45] May 20, 1975

[54] RECLAMATION OF NON-COMBUSTIBLE LIQUIDS BY DIRECT FLAME VAPORIZATION, CENTRIFUGAL SOLIDS SEPARATION AND SUBSEQUENT CONDENSATION

[76] Inventor: Joseph W. Griffith, 8705 S.W. White Court, Portland, Oreg. 97225

[22] Filed: July 20, 1972

[21] Appl. No.: 273,504

Related U.S. Application Data

[63] Continuation-in-part of Ser. No. 231,153, March 2, 1972, abandoned.

[52] U.S. Cl. .................... 203/11; 203/87; 159/16 R
[51] Int. Cl. ........................... B01d 3/00; B01d 3/10
[58] Field of Search ................. 159/16 A, 6 R, 4 A; 203/10, 11

[56] References Cited
UNITED STATES PATENTS

| | | | |
|---|---|---|---|
| 2,638,444 | 5/1953 | Kappe | 159/16 A |
| 2,762,429 | 9/1956 | Peterson | 159/16 A |
| 2,921,004 | 1/1960 | Wood | 203/10 |
| 3,080,302 | 3/1963 | Rogers | 203/10 |
| 3,241,548 | 3/1966 | See | 159/16 A |
| 3,247,889 | 4/1966 | Williams | 159/16 A |
| 3,317,306 | 5/1967 | Getsinger | 159/16 A |
| 3,423,294 | 1/1969 | Sephton | 203/10 |

FOREIGN PATENTS OR APPLICATIONS

| | | | |
|---|---|---|---|
| 780,272 | 7/1957 | United Kingdom | 159/4 A |
| 1,059,786 | 2/1967 | United Kingdom | 159/16 A |

Primary Examiner—Norman Yudkoff
Assistant Examiner—Frank Sever
Attorney, Agent, or Firm—Oliver D. Olson

[57] ABSTRACT

Pure non-combustible liquid is reclaimed from an impure liquid source containing dissolved and non-soluble contaminants, by vaporizing the liquid and volatile contaminants and subjecting the vapors directly to hot gases of combustion of a combustible fuel. The non-combustible solids contaminants are separated by momentum differences, the non-condensible gases are scrubbed clean and exhausted, and the condensible liquid is recovered in pure form by condensation.

6 Claims, 4 Drawing Figures

3,884,768

RECLAMATION OF NON-COMBUSTIBLE LIQUIDS BY DIRECT FLAME VAPORIZATION, CENTRIFUGAL SOLIDS SEPARATION AND SUBSEQUENT CONDENSATION

CROSS-REFERENCE TO RELATED APPLICATION

This application is a continuation-in-part of my earlier filed application, Ser. No. 231,153, filed Mar. 2, 1972 and entitled FLAME CENTRIFUGE WATER RECLAIM SYSTEM, now abandoned.

BACKGROUND OF THE INVENTION

This invention relates to the purification of liquids, and more particularly to the reclamation of pure liquids from industrial waste and other sources of impure non-combustible liquids.

It has been the general practice heretofore to dispose of industrial and other liquid wastes by discharging them into the rivers, lakes and oceans. Recovery of such wastes heretofore has received little attention, in part because of the lack of recognition of the impact of such ecological contamination and in part because of the magnitude of cost involved in such recovery. The relatively insignificant recovery efforts made heretofore have involved such elementary procedures as the use of settling ponds for the gravimetric separation of solids, and the rather expensive but simple chemical treatments for the precipitation of certain contaminants. Both procedures are completely ineffective in the reclamation of pure non-combustible liquids. Moreover, both procedures contribute adversely to further ecological pollution by the production of sludge contaminants and additional chemical by-products. Of equal significance is the consequent loss of potentially reusable liquids.

SUMMARY OF THE INVENTION

In its basic concept, this invention provides for the reclamation of non-combustible liquids from dissolved and non-soluble contaminants by subjecting the vapor phase thereof to hot gases of combustion, separating the resulting non-combustible solids by momentum differences, the condensible liquid by condensation and exhausting the cleaned non-condensible gases.

It is by virtue of the foregoing basic concept that the principal objective of this invention is achieved; namely, to overcome the aforementioned disadvantages and limitations of prior recovery procedures and to provide for the recovery of non-combustible liquids in pure form for reuse, while simultaneously contributing beneficially to the enhancement of the environment.

Another important object of this invention is the provision of method and apparatus by which to recover pure water and other non-combustible liquids from industrial and other liquid wastes with minimum cost and maximum efficiency.

The foregoing and other objects and advantages of this invention will appear from the following detailed description, taken in connection with the accompanying drawings of preferred embodiments.

DESCRIPTION OF THE PREFERRED EMBODIMENTS

Figure 1:
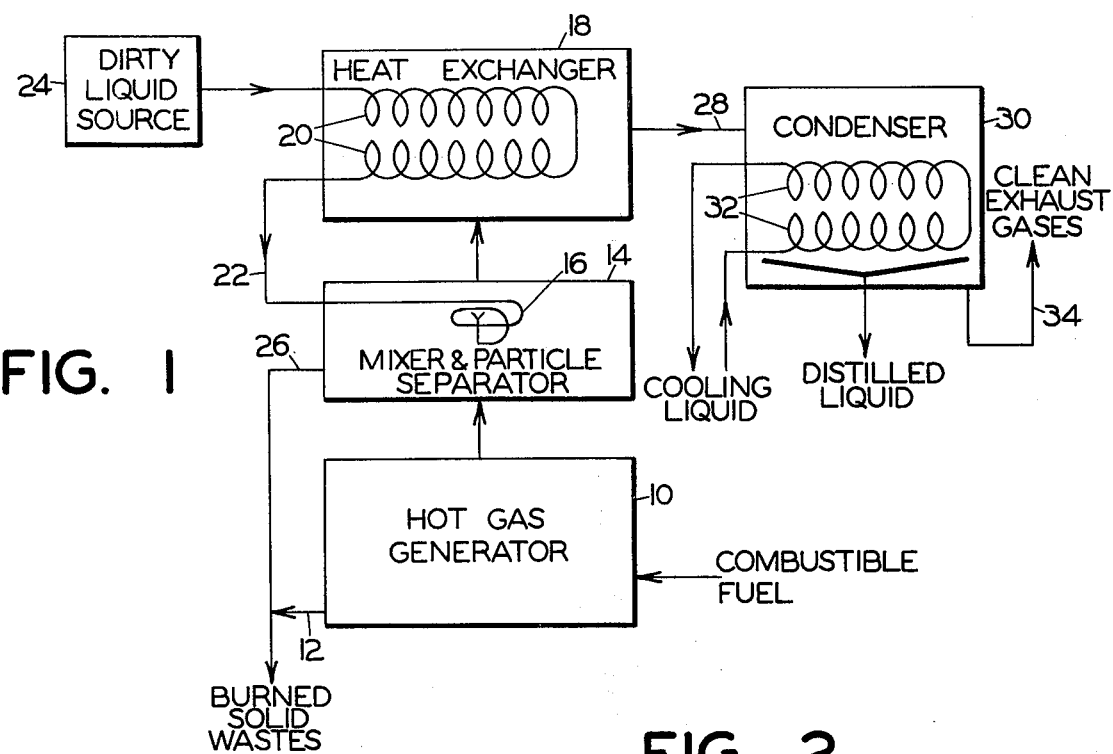
FIG. 1 is a schematic flow diagram illustrating the present invention in one of its embodiments.

Referring first to the flow diagram of FIG. 1, the oxidizing gases, preferably including the flame thereof, resulting from the burning of a combustible fuel by means of a conventional burner, is introduced tangentially into a hot gas generator chamber 10. The swirling gases of combustion function to centrifuge any non-combustible solids radially outward to the generator chamber wall, from whence they exit through a discharge pipe 12. The swirling gases of combustion travel upward into a mixer and particle separator chamber 14 containing a heat exchange coil 16 or other passageway and thence further upward into a heat exchange chamber 18 containing another heat exchange coil 20 or other passageway. The heat exchange coils are interconnected by a pipe 22. Dirty liquid to be reclaimed thus passes from a source 24 through the heat exchange coils and into the mixer and particle separator chamber 14.

The heat of the gases of combustion is absorbed by the dirty liquid partially in the heat exchange passageway 20, elevating the temperature of the liquid substantially to its boiling point. The heated liquid then enters the heat exchange passageway 16 in the mixer and particle separator chamber wherein additional heat is transferred to the liquid. Accordingly, there are introduced into the chamber 14 vapors of the liquid and the volatile and combustile contaminants. The combustible vapors and solids are ignited by hot oxidizing gases of combustion. The heavy non-combustible solid contaminants are centrifuged radially outward by the swirling gases of combustion to the inner wall of the chamber 14, from whence they exit through the discharge pipe 26.

The clean non-combustible vapors and gases pass upward through the heat exchange chamber 18, transferring further heat to dirty liquid in the heat exchanger coil 20. The cooled vapors and gases then pass through an outlet passageway 28 and enter condenser chamber 30 wherein they give up further heat to cooling water or other fluid circulating through condenser coils 32 or other coolant passageways. The condensible vapors thus are converted to liquid which is collected as pure, distilled liquid for further use. The clean, dry, non-condensible gases are exhausted through a passageway 34 either to the atmosphere or to further processing.

Figure 3:
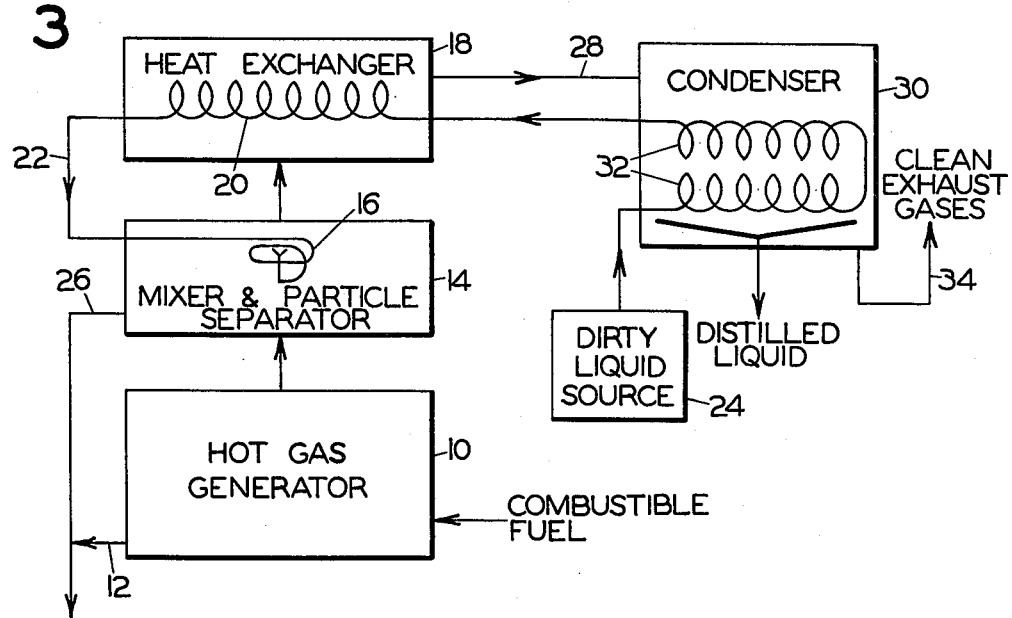
FIG. 3 is a flow diagram of the present invention in a second embodiment.

The flow diagram of FIG. 3 is similar to that of FIG. 1 with the exception that the dirty liquid source 24 is utilized first as the source of cooling liquid for the condenser passageway 32 before passing through the heat exchange passageways 20 and 16 on its way to the mixer and particle separator chamber 14. This procedure contributes to somewhat increased efficiency of liquid reclamation by transferring heat from the vapors and gases in the condenser chamber 30 to the dirty liquid, instead of to an external source of cooling liquid.

Figure 2:
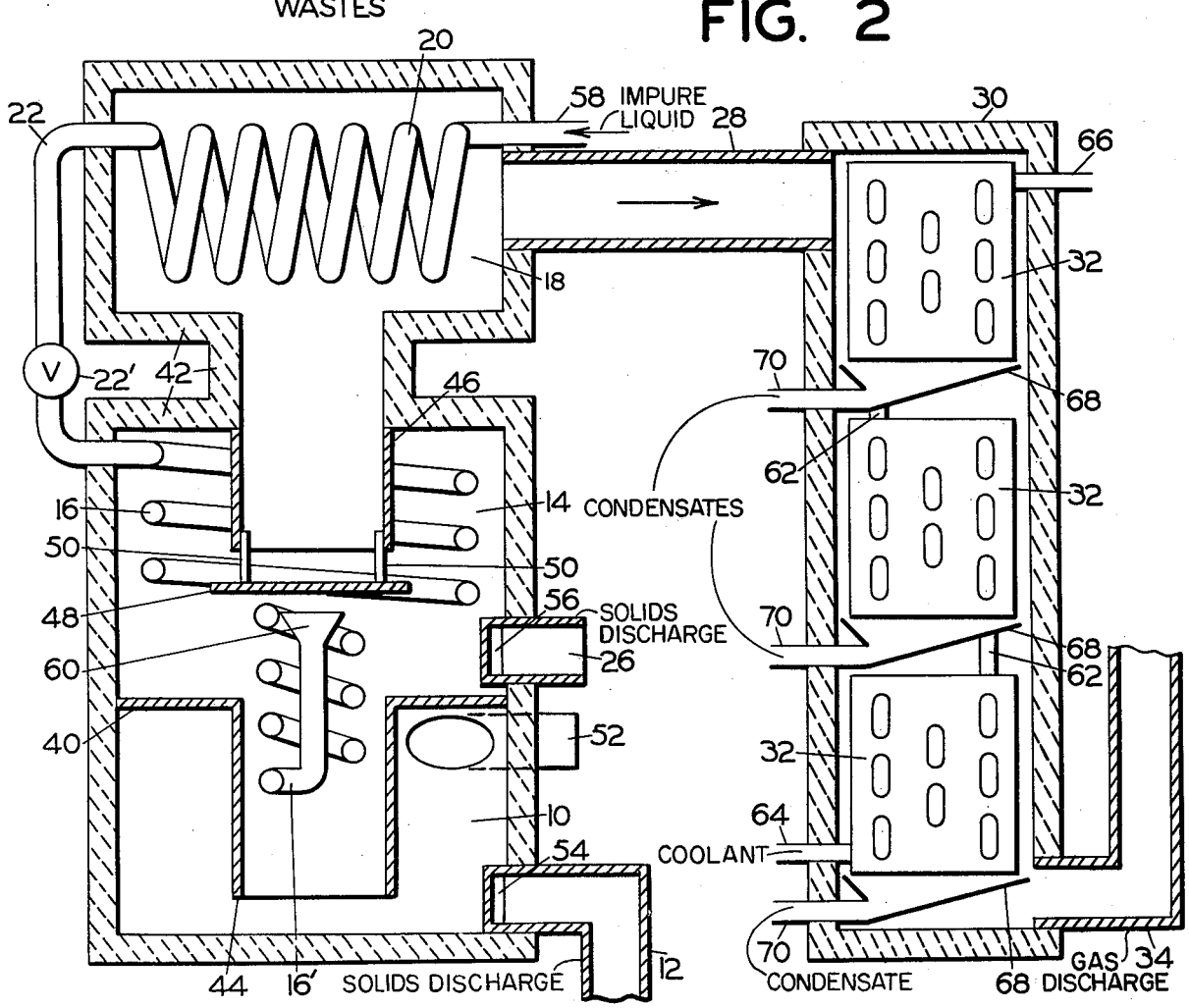
FIG. 2 is a view in vertical section of apparatus embodying the features of this invention.

Referring now to FIG. 2 of the drawings, the apparatus illustrated therein is designed to operate on the principle of the flow diagram illustrated in FIG. 1. It includes a cylindrical housing which is constructed of refractory material, or its inner surfaces are lined with refractory material, as desired. The housing is divided into three vertically arranged chambers 10, 14 and 18 by means of partitioning walls 40 and 42. The lowermost chamber 10 communicates with the central chamber 14 through a central pipe 44, and the central chamber communicates with the uppermost chamber 18 through a central pipe 46. A transverse baffle 48 is secured to and spaced downwardly from the lower open end of the pipe 46, as by means of circumferentially spaced brackets 50, to prevent direct access to the pipe 46 and thus prevent remixing of separated solids with escaping vapors.

A tangential flame entrance pipe 52 extends through the housing wall in communication with the lowermost chamber 10 which serves as a firebox for the generation of hot combustion gases. The outer end of the pipe 52 communicates with a burner of oil, gas, or other combustible fuel.

A solids discharge pipe 12 extends through the housing side wall adjacent the bottom wall of the firebox chamber 10 and is provided at its inner end with an angularly disposed solids deflector plate 54. The plate extends angularly inward in the direction facing the trailing direction of swirling combustion gases in the chamber, as produced by the tangential flame inlet.

The central chamber 14 functions as a mixer of hot combustion gases from the firebox chamber 10 and the vapors and solids components of the impure liquid source to be treated. A solids discharge pipe 26 extends through the housing wall adjacent the bottom partitioning wall of the chamber and is provided at its inner end with an angularly exposed solids deflector plate 56 arranged in the same manner and for the same purpose as the deflector plate 54 previously described.

The uppermost chamber 18 functions as a heat exchange chamber. Accordingly, there is contained within the chamber a tubing coil 20 or other form of structure of heat conductive material providing a passageway for the impure liquid to be treated. For this purpose the inlet end of the passageway 20 communicates through a pipe 58 extending through the side wall of the housing from a source 24 of impure liquid.

The outlet end of the passageway 20 communicates with an outlet 22 pipe which extends downward into the central chamber 14 where it communicates with the upper end of a heat exchange coil 16. The upper portion of this coil is disposed concentrically about the pipe 46 and baffle 48. The lower portion of the coil is of reduced diameter and extends downward into the central communicating pipe 44. The outlet portion 16' of the coil then extends upwardly within the lower portion of coil and terminates slightly below the baffle in a flared outlet 60.

The heat exchange chamber 18 communicates through a vapor outlet pipe 28 with the interior of a hollow condenser housing 30. In the embodiment illustrated, the condenser housing contains a plurality of vertically arranged, hollow condenser plates 32 of heat conductive material, interconnected by pipes 62 for the passage of coolant liquid therethrough from the inlet pipe 64 to the outlet pipe 66.

A condensate collecting receptacle 68 underlies each of the vertically disposed groups of condenser plates, for collecting various condensate fractions. Each receptacle is provided with an outlet pipe 70 which extends through the side wall of the condenser housing.

A gas discharge pipe 34 communicates with the interior of the condenser housing 30 adjacent the bottom end thereof, and its outlet end communicates either with the atmosphere or with further processing apparatus.

The operation of the apparatus illustrated in FIG. 2 is as follows: With a burner firing into the firebox 10 through the tangential pipe 52, the hot combustion gases are caused to swirl in the firebox at relatively high velocity. Any non-combustible solids entrained in the swirling gases are centrifuged radially outward to the inner surface of the firebox, where they gravitate downward and are ejected by the deflector plate 54 into the discharge pipe 12.

The swirling hot combustion gases pass upward through the pipe 44 into the central chamber 14, where their continued swirling motion functions to effect further extraction of non-combustible solids through the discharge pipe 26. The hot combustion gases in the central chamber then enter the pipe 46, radially through the space above the baffle 48, and proceed upwardly through the heat exchange chamber 18.

Impure liquid to be reclaimed meanwhile is delivered from its source 24 through the heat exchange coil 20, wherein it absorbs some of the heat from the hot combustion gases in the heat exchange chamber 18. The liquid thus is brought substantially to its boiling point. This heated liquid then passes downward through the outlet pipe 22 and coil 16 in the central chamber 14, and thence upward through the flared outlet 60. The heated liquid thus enters the central chamber 14 and bursts into vapor which is mixed with the swirling hot gases of combustion. The combustible contaminants in the impure liquid are ignited by the oxidizing gases of combustion and consumed in the central chamber. Any non-combustible solid contaminants are centrifuged out through the discharge pipe 26.

It will be understood that if the impure liquid contains no combustible contaminants, the source of combustion gases need not be of the oxidizing type.

The condensible and non-condensible vapors mixed with the hot combustion gases in the central chamber 14 pass upward through the pipe 46 into the heat exchange chamber 18, where they give up further heat to the incoming impure liquid in the coil 20. They then pass through the outlet pipe 28 into the condenser housing 30.

The partially cooled vapors in the condenser chamber transfer further heat to the coolant liquid circulating through the condenser plates 32. The condensible components of the vapor thus are liquified and collected in the receptacles 68 for recovery. The non-condensible components of the vapor will have been scrubbed clean during their passage downward past the condenser plates. These cleaned gases thus are exhausted through the pipe 34 either to the atmosphere or to subsequent processing equipment.

The capability of the illustrated condenser to fractionally distil a condensible liquid containing contaminants, may be illustrated as follows: Assuming impure water effluent from a paper mill is to be reclaimed in pure form, the water vapor mixed with the hot combustion gases in the central chamber 14 may include carbon dioxide as a result of burning oil or natural gas in the firebox and sulfur dioxide from the paper mill process. As these vapors enter the upper end of the condenser chamber 30 and the water vapor condenses to liquid form, it dissolves therein a portion of a vapor content of sulphur dioxide and carbon dioxide. Pure, distilled water thus is recovered at the upper collector pipe 70; water with dissolved sulpher dioxide is recovered at the central collector pipe; and water with dissolved carbon dioxide is recovered at the lower collector pipe.

The apparatus illustrated in FIG. 2 may be modified readily to operate in accordance with the flow diagram illustrated in FIG. 3. For this purpose the coolant outlet pipe 66 simply is connected to the inlet pipe 58 of the heat exchanger coil 20, and the source 24 of impure liquid to be treated is connected to the coolant inlet pipe 64.

Figure 4:
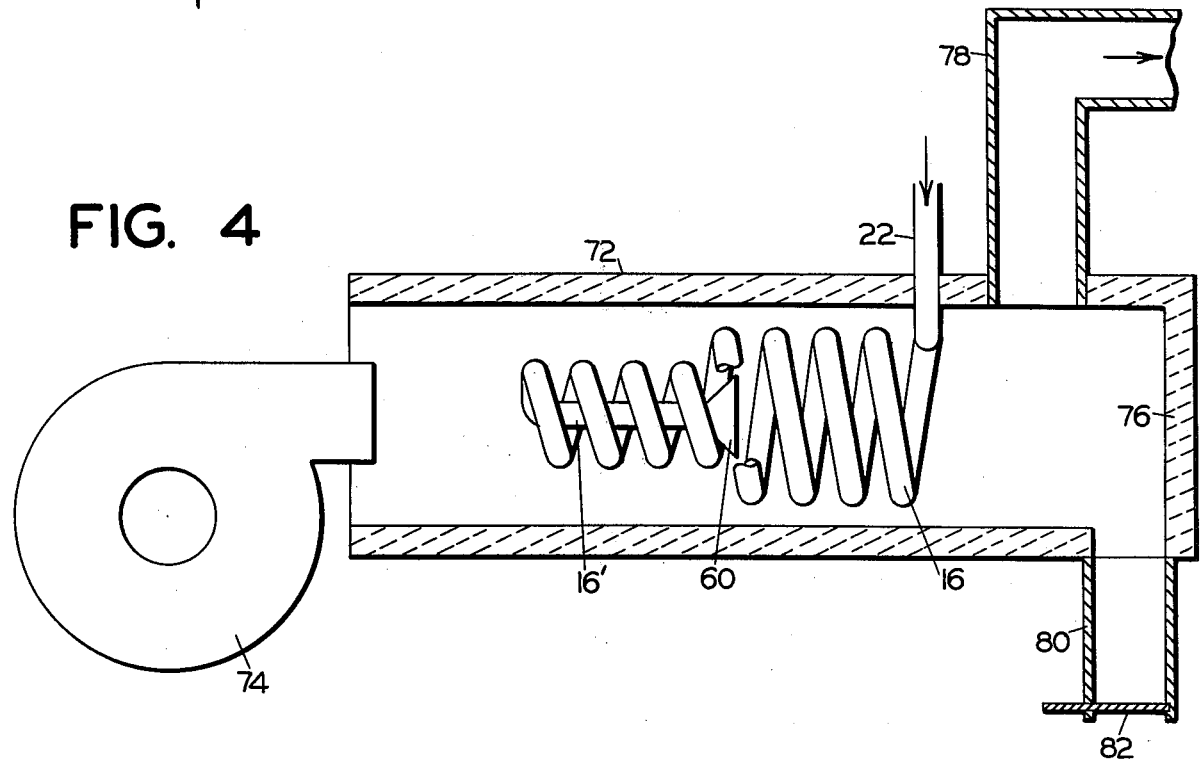
FIG. 4 is a view in vertical section of another form of apparatus embodying the features of this invention.

FIG. 4 illustrates a second form of apparatus embodying the features of this invention. It includes a horizontal hollow housing 72 of refractory, or refractory-lined, material having an inlet end communicating with a burner 74 of combustible fuel and an outlet end closed by end wall 76. The heat exchange coil assembly 16 of FIG. 2 is disposed horizontally within the housing, with the flared outlet 60 directed away from the inlet end of the housing. The outlet pipe 22 of FIG. 1 communicates with a source 24 of impure liquid to be reclaimed.

Adjacent the closed end of the horizontal housing is a vapor outlet pipe 78, similar to the outlet pipe 28 in FIG. 2, which communicates the upper, rearward end of the housing with a condenser housing 30 such as that also illustrated in FIG. 2.

A solids discharge pipe 80 communicates with the bottom side of the horizontal housing at the closed end thereof, and extends downwardly therefrom. Its outlet end is closed removably by a gate 82 of any desired construction, such as the reciprocating gate illustrated. This gate periodically is opened to discharge solids collected in the pipe 80 as a result of operation of the apparatus.

The operation of the apparatus illustrated in FIG. 4 is quite similar to the operation of the apparatus illustrated in FIG. 2. However, whereas the apparatus of FIG. 2 functions to remove non-combustible solids by centrifugal momentum differences, the apparatus of FIG. 4 functions to remove such solids by linear momentum differences. Thus, the hot combustion gases generated by the burner 74 travel at relatively high velocity linearly through the horizontal housing and thence through the outlet pipe 78 to the condenser 30. The non-combustible solids entrained in this high velocity gaseous stream are carried with the latter to the end wall 76 of the housing, from which they gravitate downward into the discharge pipe 80.

From the foregoing it will be appreciated that the present invention provides simplified and therefore economical means by which to achieve reclamation of large volumes of condensible, non-combustible liquids in pure form, from a wide variety of industrial and other liquid wastes. For example, the present invention is highly effective and efficient in the recovery of pure, distilled water from liquid sewage, the aqueous chemical solution effluent from paper mills, the aqueous soap and detergent effluent from laundries, car washes and the like, and many other sources of high volume liquid wastes. Solids contaminants also are recovered in sterilized form, by incineration. Malodorous gases are scrubbed clean, to minimize pollution of the air.

It will be apparent to those skilled in the art that various changes may be made in the method steps and in the size, shape, type, number and arrangement of parts described hereinbefore. For example, the vertically disposed chambers 14 and 18 in FIG. 2 may be combined into one, as in the horizontal housing 72 of FIG. 4. An adjustable pressure valve 22' (FIG. 2) may be provided in pipe 22 to control the boiling point of liquid to be reclaimed, such that a pressure above atmospheric may be maintained in passageway 20 to keep the liquid therein in liquid form, to be released as vapor into passageway 16. The type of condenser illustrated may be replaced by any one of a variety of well known condensers and fractional vapor condensers, as will be apparent. These and other modifications may be made, as desired, without departing from the spirit of this invention.

Having now described my invention and the manner in which it may be used, I claim:

1. The method of reclaiming condensible, non-combustible liquid containing impurities, comprising
   a. vaporizing the liquid,
   b. mixing the vaporized liquid and impurities with the hot gases of combustion of a combustible fuel,
   c. separating the non-combustible solids component of impurities from the mixture by momentum differences, and
   d. separating the condensible liquid from the non-condensible vapor component of impurities by condensation.

2. The method of claim 1 wherein the hot gases of combustion include the flame thereto.

3. The method of claim 1 wherein the hot gases of combustion are of the oxidizing type to effect ignition of the combustible component of impurities.

4. The method of claim 1 wherein the hot gases of combustion are utilized to vaporize the liquid.

5. The method of claim 1 wherein the separation by momentum differences is achieved by centrifugal action by causing the hot gases of combustion to rotate in a confined space, whereby to centrifuge the solids component radially outward to the boundary of said confined space.

6. The method of claim 1 wherein the separation by momentum differences is achieved by gravitation by causing the hot gases of combustion to move linearly through a confined space whereby to cause the solids component to gravitate downward in said confined space.

* * * * *